United States Patent
Han et al.

(10) Patent No.: US 12,411,354 B2
(45) Date of Patent: Sep. 9, 2025

(54) CAMERA MODULE

(71) Applicant: SAMSUNG ELECTRO-MECHANICS CO., LTD., Suwon-si (KR)

(72) Inventors: Sanghun Han, Suwon-si (KR); Soo Cheol Lim, Suwon-si (KR); Kum-Kyung Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 418 days.

(21) Appl. No.: 18/109,748

(22) Filed: Feb. 14, 2023

(65) Prior Publication Data

US 2024/0069356 A1 Feb. 29, 2024

(30) Foreign Application Priority Data

Aug. 25, 2022 (KR) .................. 10-2022-0106875

(51) Int. Cl.
*G02B 27/64* (2006.01)
*G03B 5/04* (2021.01)
*G03B 13/36* (2021.01)

(52) U.S. Cl.
CPC ............ *G02B 27/646* (2013.01); *G03B 5/04* (2013.01); *G03B 13/36* (2013.01); *G03B 2205/0015* (2013.01)

(58) Field of Classification Search
CPC ............ G02B 7/02; G02B 7/021; G02B 7/04; G02B 7/08; G02B 7/09; G02B 27/646; G03B 13/36; G03B 5/00; G03B 30/00
See application file for complete search history.

(56) References Cited

U.S. PATENT DOCUMENTS

2012/0250156 A1 10/2012 Asakawa et al.
2016/0246029 A1 8/2016 Kim et al.
(Continued)

FOREIGN PATENT DOCUMENTS

JP          5762087 B2    8/2015
KR   10-2020-0051998 A    5/2020
(Continued)

OTHER PUBLICATIONS

Korean Office Action issued on Aug. 26, 2024, in counterpart Korean Patent Application No. 10-2022-0106875 (1 page in English, 2 pages in Korean).

*Primary Examiner* — Cara E Rakowski
(74) *Attorney, Agent, or Firm* — NSIP Law

(57) ABSTRACT

A camera module includes a housing having an interior space; an Auto Focusing (AF) carrier disposed in the interior space of the housing and housing a lens barrel; a lens holder to which the lens barrel is fixed and accommodated in the AF carrier; an Optical Image Stabilization (OIS) driver configured to drive the lens holder to move in a first direction or a second direction perpendicular to an optical-axis, wherein the first direction and the second direction are perpendicular to each other within the AF carrier; and an OIS stopper including an inward protrusion protruding from one inner surface of the housing in the first direction towards the lens holder, and an outward protrusion protruding from one outer surface of the lens holder towards the one inner surface of the housing and opposite the inward protrusion in the second direction.

17 Claims, 6 Drawing Sheets

(56) References Cited

U.S. PATENT DOCUMENTS

| | | |
|---|---|---|
| 2018/0164537 A1 | 6/2018 | Lee |
| 2020/0341291 A1 | 10/2020 | Lim |
| 2021/0364733 A1 | 11/2021 | Lee et al. |
| 2021/0405321 A1 | 12/2021 | Kwon et al. |
| 2022/0066290 A1 | 3/2022 | Kim et al. |
| 2022/0099992 A1 | 3/2022 | Park et al. |
| 2023/0033037 A1* | 2/2023 | Jeon .................. H04N 23/687 |
| 2024/0430569 A1* | 12/2024 | Jung .................. H04N 23/55 |

FOREIGN PATENT DOCUMENTS

| | | | |
|---|---|---|---|
| KR | 10-2022-0000785 A | 1/2022 | |
| KR | 10-2347938 B1 | 1/2022 | |
| KR | 10-2369442 B1 | 3/2022 | |
| KR | 10-2022-0057495 A | 5/2022 | |
| KR | 10-2434621 B1 | 8/2022 | |
| KR | 10-2711767 B1 | 9/2024 | |
| WO | WO-2022164274 A1 * | 8/2022 | ............. G03B 17/12 |

* cited by examiner

CAMERA MODULE

CROSS-REFERENCE TO RELATED APPLICATION

This application claims the benefit under 35 USC 119(a) of Korean Patent Application No. 10-2022-0106875 filed in the Korean Intellectual Property Office on Aug. 25, 2022, the entire disclosure of which is incorporated herein by reference for all purposes.

BACKGROUND

1. Field

The present disclosure relates to a camera module.

2. Description of the Related Art

With the remarkable development of information communication technology and semiconductor technology, the dissemination and use of electronic devices are rapidly increasing. Such an electronic device tends to provide various functions through convergence rather than in its traditional unique regions.

Recently, cameras have been adopted in portable electronic devices such as smartphones, tablet PCs, and laptop computers. These portable electronic devices include an auto focus (AF) function, an image stabilizer (IS) function, and a zoom function.

The image stabilization function may include both camera shake compensation and hand shake compensation, and thus vibration of a photographed image of a subject that may occur when the camera is in a moving or stationary state and hand shake or camera shake that unintentionally occurs by a photographer can be prevented.

The auto-focus function is a function that enables a clear image to be acquired from an imaging plane of an image sensor by moving a lens positioned in front of the image sensor along an optical axis direction according to a distance from the subject.

As the level of sophistication of the camera module and the weight of a lens transferring unit increase, deformation such as stamping or indentations due to vibration is generated, thereby deteriorating the performance of the camera and causing market defects. Therefore, for the smooth implementation of the auto focus function, the image stabilization function, and the zoom function, it may be desirable to mitigate the impact between the lens transferring unit and a counterpart.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing having an interior space; an Auto Focusing (AF) carrier disposed in the interior space of the housing and housing a lens barrel; a lens holder to which the lens barrel is fixed and accommodated in the AF carrier; an Optical Image Stabilization (OIS) driver configured to drive the lens holder to move in a first direction or a second direction perpendicular to an optical-axis, wherein the first direction and the second direction are perpendicular to each other within the AF carrier; and an OIS stopper including an inward protrusion protruding from one inner surface of the housing in the first direction towards the lens holder, and an outward protrusion protruding from one outer surface of the lens holder towards the one inner surface of the housing and opposite the inward protrusion in the second direction.

The AF carrier may include an AF driving surface opposed to the one inner surface of the housing with a rolling member interposed therebetween, and each opposing surface of the outward protrusion and the inward protrusion may face a direction perpendicular to the AF driving surface.

When the outward protrusion and the inward protrusion face each other and are in contact, one inner surface of the AF carrier where the AF driving surface is disposed and the one outer surface of the lens holder facing each other may be spaced apart.

The outward protrusion may be disposed at an end of the lens holder furthest away from the AF driving surface in the second direction.

The housing may include a protrusion accommodating groove configured to accommodate the outward protrusion on the one inner surface where the inward protrusion is disposed, and the inward protrusion may form the inner surface of one side of the protrusion accommodating groove.

Another inner surface of the protrusion accommodating groove may be configured to face the outward protrusion in the second direction.

A length along the first direction of the inward protrusion facing the outward protrusion within the protrusion accommodating groove may be longer than a length of a maximum stroke of the lens holder in the first direction.

The AF carrier may include an AF driving surface opposed to the one inner surface of the housing with a rolling member interposed therebetween, and the OIS stopper may further include a first OIS stopper and a second OIS stopper disposed on both sides of a reference plane perpendicular to the AF driving surface and passing through the optical-axis.

The first OIS stopper may further include a first inward protrusion protruding from the housing and a first outward protrusion protruding from the lens holder, the second OIS stopper may include a second inward protrusion protruding from the housing and a second outward protrusion protruding from the lens holder, and the first outward protrusion and the second outward protrusion may be symmetric about a plane perpendicular to the AF driving surface and passing through the optical axis.

In another general aspect, a camera module includes a housing having an interior space; an Auto Focusing (AF) carrier disposed in the interior space of the housing and housing a lens barrel; a lens holder to which the lens barrel is fixed and accommodated within the carrier; an Optical Image Stabilization (OIS) driver configured to drive the lens holder to move in a first direction or a second direction perpendicular to the optical-axis within the carrier, wherein the first direction and the second direction are perpendicular to each other; and an OIS stopper including an outward protrusion protruding in the first direction from a one outer surface of the lens holder toward a one inner surface of the housing, and a protrusion accommodating groove recessed from the one inner surface of the housing to accommodate the outward protrusion and having an inner side surface to limit a movement range of the outward protrusion in the second direction.

The AF carrier may include an AF driving surface opposed to the one inner surface of the housing with a rolling member interposed therebetween, and the inner side surface of the protrusion accommodating groove and each opposing surface of the outward protrusion may face a perpendicular direction to the AF driving surface.

When the inner side surface of the protrusion accommodating groove and the outward protrusion face each other and are in contact, the one inner surface where the AF driving surface of the AF carrier is disposed and the one outer surface of the lens holder facing each other may be spaced apart.

One inner surface of the protrusion accommodating groove farthest from the AF driving surface may be configured to face the outward protrusion in the second direction.

The AF carrier may include an AF driving surface opposed to the one inner surface of the housing with a rolling member interposed therebetween, and the OIS stopper may include a first OIS stopper and a second OIS stopper that are disposed on both sides of a reference plane perpendicular to the AF driving surface and passing through the optical axis.

The first OIS stopper may further include a first protrusion accommodating groove recessed on the one inner surface of the housing and a first outward protrusion protruding from the lens holder, the second OIS stopper may include a second protrusion accommodating groove recessed on the other surface of the inner side of the housing and a second outward protrusion protruding from the lens holder, and the first outward protrusion and the second outward protrusion may be symmetric about a plane perpendicular to the AF driving surface and passing through the optical axis.

The protrusion accommodating groove may have a bottom surface to limit a movement range of the outward protrusion in the first direction.

A length along the first direction of the inner side surface of the protrusion accommodating groove opposite the outward protrusion in the second direction may be longer than a length of a maximum stroke of the lens holder in the first direction.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
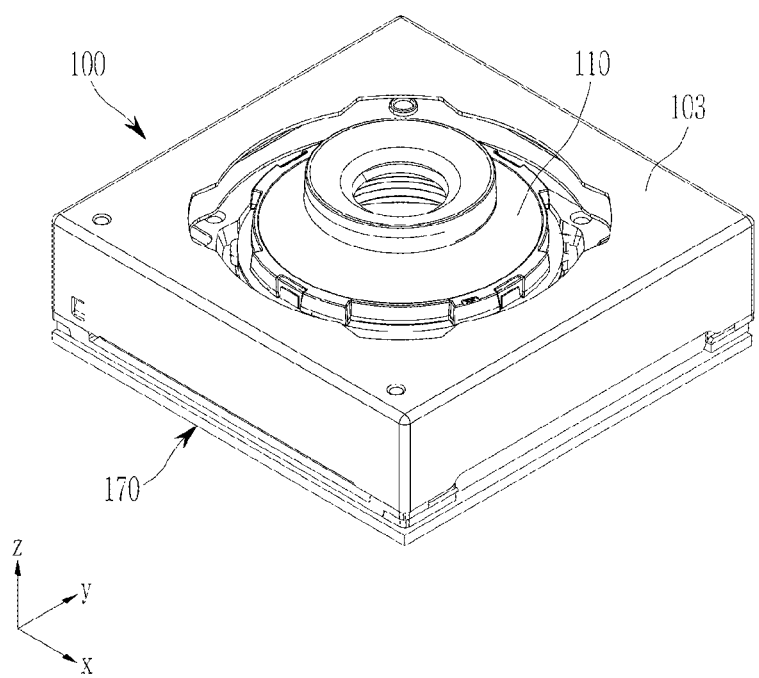
FIG. 1 is a perspective view showing an appearance of a camera module according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

An optical axis may be set as a central axis of a lens perpendicular to a lens surface, and an optical axis direction refers to a direction parallel to a central axis. In drawings below, the optical axis is set to a z-axis, and an x-axis and a y-axis are set as directions perpendicular to the optical axis. At this time, the x-axis and the y-axis are perpendicular to each other, and the x-y plane formed by the x-axis and the y-axis becomes a plane perpendicular to the optical axis.

Figure 2:
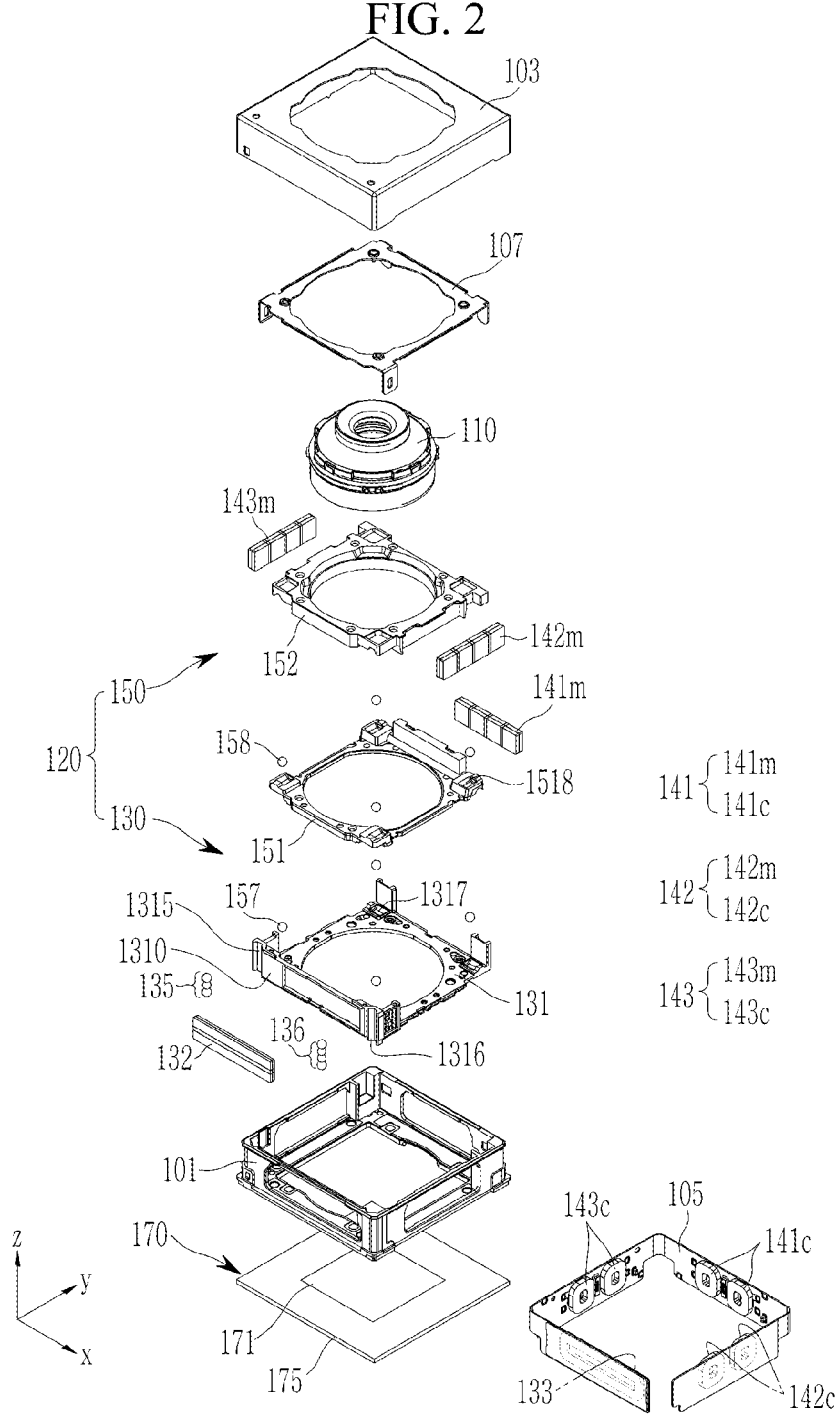
FIG. 2 is an exploded perspective view schematically showing a camera module of FIG. 1.

FIG. 1 is a is a perspective view showing an appearance of a camera module according to an embodiment, and FIG. 2 is an exploded perspective view schematically showing a camera module shown in FIG. 1.

Referring to FIG. 1 and FIG. 2, a camera module 100, according to the present embodiment, includes a lens barrel 110, a lens driving apparatus 120 configured to move the lens barrel 110, and an image sensor unit 170 configured to convert light incident through the lens barrel 110 into an electric signal. Also, the lens barrel 110 and the lens driving apparatus 120 are housed in a housing 101, and the housing 101 is covered with a cover 103.

The lens barrel 110 may have a cylindrical shape having a hollow space so that a plurality of lenses for imaging a subject may be accommodated therein, and a plurality of lenses are mounted on the lens barrel 110 along an optical axis. A plurality of lenses are disposed as many as desired according to the design of the lens barrel 110, and each lens may have the same or different optical characteristics, e.g., the same or different refractive index.

The lens driving apparatus 120 is a device configured to move the lens barrel 110 and may include an auto focus (AF) unit 130 configured to adjust a focus and an optical image stabilization (OIS) unit 150 for correcting a hand shake or a shake.

For example, the lens driving apparatus 120 may adjust a focus or implement a zoom function by moving the lens barrel 110 in the optical axis direction (the z-axis direction of the drawing) by using the AF unit 130, and may correct the hand shake or the shake by moving the lens barrel 110 in a direction perpendicular to the optical axis direction (the x-axis or the y-axis direction in the drawing) by using the OIS unit 150.

The AF unit 130 includes an AF carrier 131 accommodating the lens barrel 110 and an AF driver generating a driving force to move the lens barrel 110 and the AF carrier 131 in the optical axis direction. The AF driver may include an AF driving magnet 132 and an AF driving coil 133.

When power is applied to the AF driving coil 133, the AF carrier 131 may be moved in the optical axis direction by an electromagnetic force between the AF driving magnet 132 and the AF driving coil 133. Since the lens barrel 110 is accommodated in the AF carrier 131, the lens barrel 110 is also moved in the optical axis direction by the movement of the AF carrier 131, so that the focus may be adjusted.

For example, the AF driving magnet 132 may be mounted on one surface of the AF carrier 131, the AF driving surface 1310, and the AF driving coil 133 may be mounted on the housing 101 via the substrate 105. Here, the AF driving magnet 132 is a moving member mounted on the AF driving surface 1310 and moving in the optical axis direction together with the AF carrier 131, and the AF driving coil 133 is a fixed member fixed to the housing 101. However, the present disclosure is not limited thereto, and it may be possible to dispose by changing the positions of the AF driving magnet 132 and the AF driving coil 133.

When the AF carrier 131 is moved, ball rolling portions 1315 and 1316 are formed between the AF driving surface 1310 and the housing 101 to reduce friction between the AF carrier 131 and the housing 101, and rolling members 135 and 136 of a ball shape are disposed in the ball rolling portions 1315 and 1316. The ball rolling portions 1315 and 1316 may be formed of guide grooves so that the rolling members 135 and 136 are accommodated and limited to the optical axis direction motion.

The rolling members 135 and 136 may be disposed on both sides with reference to the center of the width direction of the AF driving surface 1310. The rolling members 135 and 136 disposed on both sides in this way may have a different number of balls, respectively, and for example, may include three balls on one side and four balls on the other side.

The OIS unit 150 is used to correct an image blur or a motion picture shake due to factors such as a user's hand or camera shake during the image shooting or the motion picture shooting. That is, the OIS unit 150 compensates for the shake by imparting a relative displacement corresponding to the shake to the lens barrel 110 when the shake occurs during the image shooting due to the user's hand shake or the like. For example, the OIS unit 150 may compensate for the shake by moving the lens barrel 110 in the first and second directions (the x-axis and the y-axis directions) perpendicular to the optical axis direction.

The OIS unit 150 includes a guide member for guiding the movement of the lens barrel 110 and an OIS driver generating a driving force configured to move the guide member in a direction perpendicular to the optical axis direction.

For example, the guide member includes a supporting frame 151 and a lens holder 152. The supporting frame 151 and the lens holder 152 are accommodated in the AF carrier 131, aligned along the optical axis direction, and serve to guide the movement of the lens barrel 110. Such a guide member is composed of a single mechanism and may be moved in the first and second directions perpendicular to the optical axis direction, which is also within the scope of the present disclosure.

The supporting frame 151 and the lens holder 152 each have a central opening into which the lens barrel 110 may be inserted, and the lens barrel 110 is coupled to and fixed to the lens holder 152 through the central opening. For example, the lens holder 152 is provided in a frame shape with four corners, and the supporting frame 151 may have a frame structure with four corners corresponding thereto.

The OIS driver may include a first OIS driver 141 and second OIS drivers 142 and 143. The first OIS driver 141 may generate a driving force in the first direction (the x-axis direction in the drawing) perpendicular to the optical axis. The second OIS drivers 142 and 143 generate the driving force in the second direction (the y-axis direction in the drawing).

The first OIS driver 141 includes a first OIS driving magnet 141m and a first OIS driving coil 141c. The second OIS drivers 142 and 143 include second OIS driving magnets 142m and 143m, and second OIS driving coils 142c and 143c. In this case, the first OIS driving magnet 141m may be mounted on the supporting frame 151, and the second OIS driving magnets 142m and 143m may be mounted on the lens holder 152. Also, the first OIS driving coil 141c and the second OIS driving coil 142c and 143c, respectively facing the first OIS driving magnet 141m and the second OIS driving magnets 142m and 143m each other may be fixedly mounted to the housing 101 via the substrate 105 as a medium.

In addition, a plurality of rolling members supporting the OIS unit 150 may be provided. A plurality of rolling members functions to smooth the motion of the supporting frame 151 and the lens holder 152 during the OIS driving process. In addition, they also function to maintain a gap between the AF carrier 131, the supporting frame 151, and the lens holder 152.

A plurality of rolling members includes a first rolling member 157 and a second rolling member 158. The first rolling member 157 may be involved in the movement in the first direction (the x-axis direction) of the OIS unit 150, and the second rolling member 158 may be involved in the movement in the second direction (the y-axis direction) of the OIS unit 150. The first rolling member 157 may include a plurality of ball members disposed between the AF carrier 131 and the supporting frame 151, and the second rolling member 158 may include a plurality of ball members disposed between the supporting frame 151 and the lens holder 152.

A plurality of first guide groove portions 1317 for accommodating the first rolling member 157 is formed in each corner region of the surface where the AF carrier 131 faces the supporting frame 151 in the optical axis direction. While the first rolling member 157 is accommodated in the first guide groove portion 1317, it may be restricted in the movement in the optical-axis direction and the second direction (the y-axis direction) and moved in the first direction (the x-axis direction).

A second guide groove portion 1518 for accommodating the second rolling member 158 is formed in each corner region of the surface where the supporting frame 151 faces the lens holder 152 in the optical axis direction. While the second rolling member 158 is accommodated in the second guide groove portion 1518, it may be restricted in the movement in the optical axis direction and the first direction (the x-axis direction) and moved in the second direction (the y-axis direction).

The image sensor unit 170 is a device configured to convert light incident through the lens barrel 110 into an electrical signal. For example, the image sensor unit 170 may include an image sensor 171 and a flexible printed circuit (FPC) 175 connected thereto, and may further include an infrared filter. The infrared filter functions to block the light of the infrared region among the light incident through the lens barrel 110.

The lens barrel 110 and the lens driving apparatus 120 are accommodated in a space inside the housing 101, for example, the housing 101 may have a box shape with open upper and lower parts. The image sensor unit 170 may be disposed in the lower part of the housing 101. An AF stopper 107 may be further disposed on the upper portion of the lens barrel 110 to prevent the separation of the supporting frame 151 and the lens holder 152 from the interior space of the AF carrier 131, and the AF stopper 107 may be coupled to the AF carrier 131.

The cover 103 is combined with the housing 101 to cover the outer surface of the housing 101, and functions to protect the internal components of the camera module 100. In addition, the cover 103 may function to shield electromagnetic waves. For example, the cover 103 may be composed of a metal shield to shield the electromagnetic waves so that the electromagnetic wave generated by the camera module 100 does not affect other electronic components in the portable electronic device.

Figure 3:
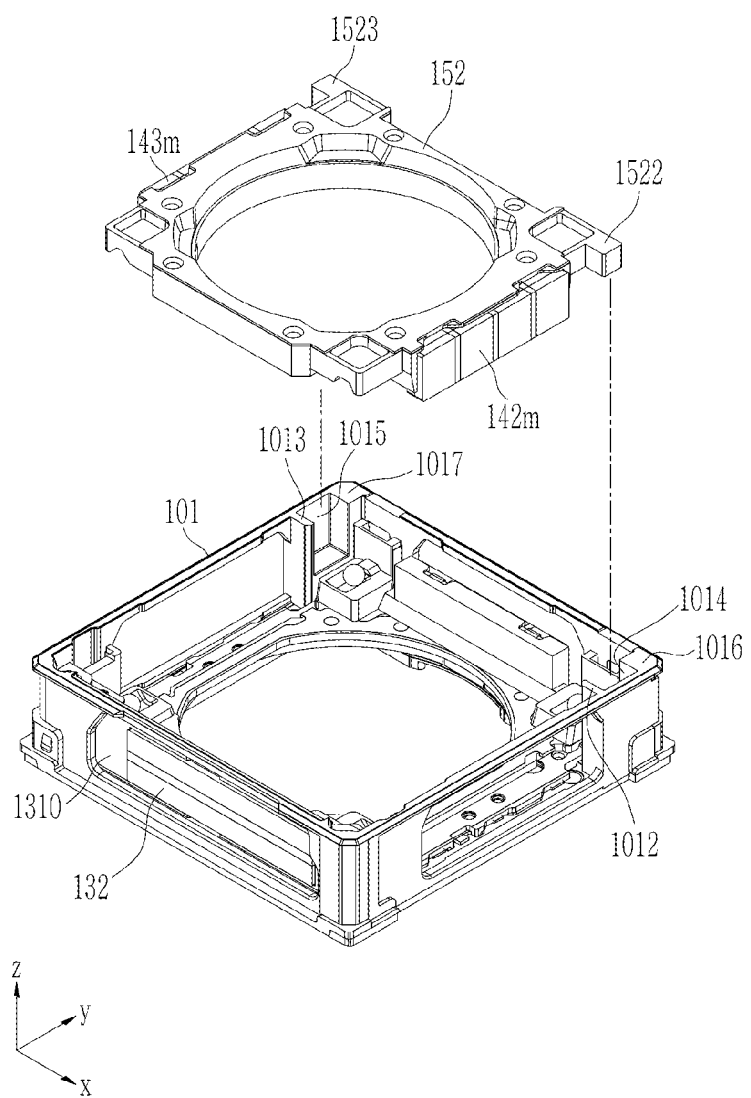
FIG. 3 is an exploded perspective view showing a lens driving apparatus of a camera module shown in FIG. 1 and is shown to explain a coupling relationship between a lens holder and a housing.
Figure 4:
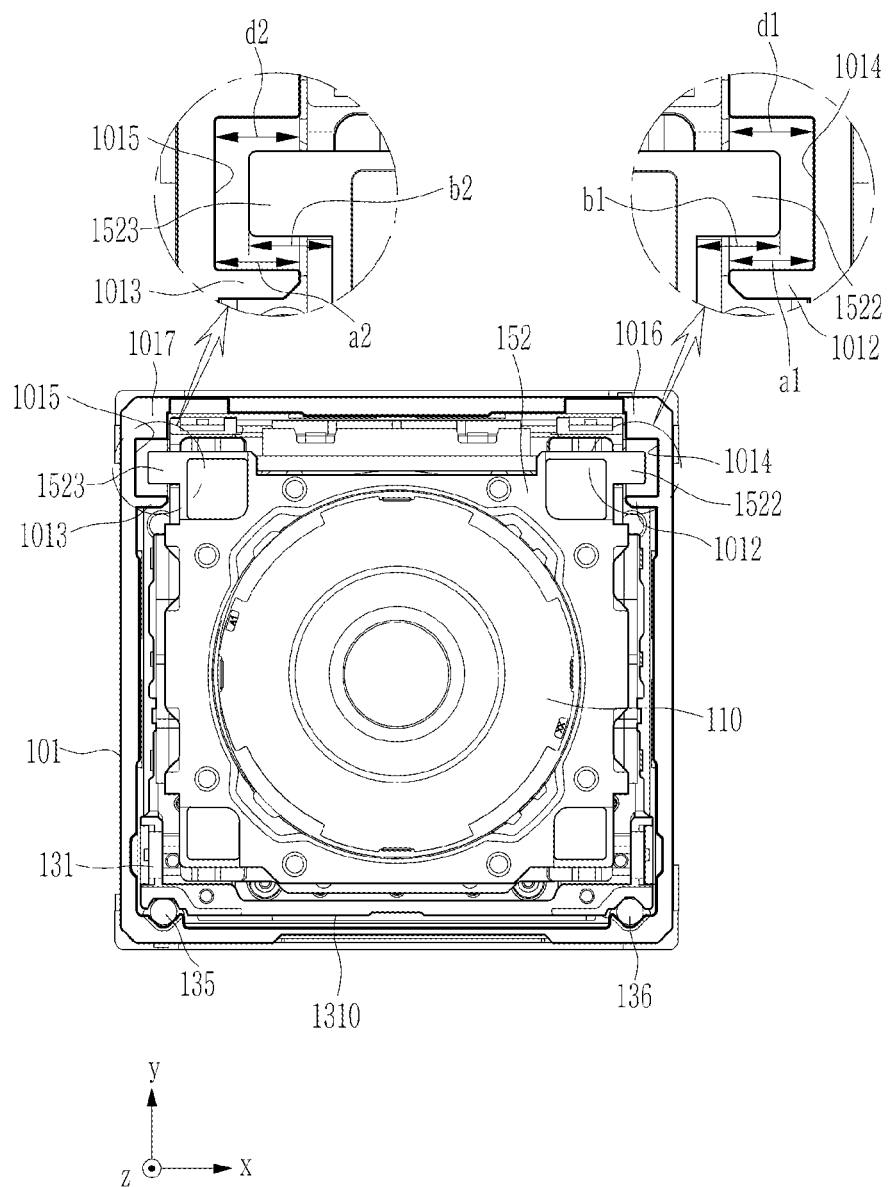
FIG. 4 is a plan view showing a lens driving apparatus of a camera module shown in FIG. 1 and shows a basic state before OIS driving.

FIG. 3 is an exploded perspective view showing a lens driving apparatus of a camera module shown in FIG. 1 and is shown to explain a coupling relationship between a lens holder and a housing, and FIG. 4 is a plan view showing a lens driving apparatus of a camera module shown in FIG. 1 and shows a basic state before OIS driving.

Referring to FIG. 3, the housing 101 and the lens holder 152 of the camera module 100, according to the present embodiment, may be provided with inward protrusions 1012 and 1013 and outward protrusions 1522 and 1523, respectively, and thereby provide an OIS stopper. That is, the OIS stopper includes the inward protrusions 1012 and 1013 and the outward protrusions 1522 and 1523, and the OIS stopper may restrict the movement range in the first direction (the x-axis direction in the drawing) or the second direction (the y-axis direction in the drawing) of the OIS unit 150. Thus, the OIS stopper may control or mitigate the impact that may occur based on the movement of other components within the housing 101.

The inward protrusions 1012 and 1013 may protrude in the first direction from the inner side of the housing 101 towards the lens holder 152. The inward protrusion 1012 and 1013 may be integrally formed with the mold structure constituting the housing 101, and a pair of inward protrusions 1012 and 1013 may be protruded and extend from the inner surface of a pair of side walls of the housing 101 perpendicular to the AF driving surface 1310 to face each other.

Protrusion accommodating grooves 1014 and 1015 may be formed on the inner surface of the side wall of the housing 101, and the inward protrusions 1012 and 1013 may form one inner surface of the protrusion accommodating grooves 1014 and 1015. That is, one side wall forming the protrusion accommodating grooves 1014 and 1015 may be the inward protrusions 1012 and 1013. Another side wall forming the protrusion accommodating grooves 1014 and 1015 may be one side of the inner edge blocks 1016 and 1017 of the housing 101. The protrusion accommodating grooves 1014 and 1015 may be formed by being recessed into the inner surface of a pair of the side walls of the housing 101 perpendicular to the AF driving surface 1310.

The outward protrusions 1522 and 1523 may be protruded in the first direction, from the outer surface of the lens holder 152, toward the inner surface of the housing 101. The outward protrusions 1522 and 1523 may be formed at the end of the lens holder 152 that is farthest from the AF driving surface 1310 in the second direction. The outward protrusion 1522 and 1523 may be integrally formed with the mold structure constituting the lens holder 152. A pair of outward protrusions 1522 and 1523 may be protruded and extend to face each other in opposite directions from a pair of exterior sides of the lens holder 152 perpendicular to the AF driving surface 1310.

On the other hand, referring to FIG. 4, the inward protrusions 1012 and 1013 and the outward protrusions 1522 and 1523 may be disposed to have faces opposite to each other in the second direction. That is, each opposite surface of the inward protrusions 1012 and 1013 and the outward protrusions 1522 and 1523 may be formed to face the direction perpendicular to the AF driving surface 1310. Therefore, while the lens holder 152 to which the lens barrel 110 is mounted is being moved in the second direction by the first OIS driver 141, if the inward protrusions 1012 and 1013 and the outward protrusions 1522 and 1523 meet and are in contact on the opposite side, the lens holder 152 stops moving in the second direction forward (the y direction of the drawing).

In addition, the outward protrusions 1522 and 1523 of the lens holder 152 may be accommodated in the protrusion accommodating grooves 1014 and 1015 of the housing 101. Thus, one side of the outward protrusions 1522 and 1523 faces the inward protrusions 1012 and 1013 of the housing 101, and the other side of the outward protrusions 1522 and 1523 face one side of the inner edge block 1016 of the housings 101 and 1017 in the second direction. Therefore, while the lens holder 152 is moved in the second direction, if the outward protrusions 1522 and 1523 meet and are in contact with one side of the inner edge blocks 1016 and 1017 of the housing 101 opposite thereto, the lens holder 152 stops moving in the second direction backward (the y direction of the drawing).

A pair of inward protrusions 1012 and 1013 formed in the housing 101 includes a first inward protrusion 1012 and a second inward protrusion 1013. A pair of outward protrusions 1522 and 1523 formed in the lens holder 152 includes a first outward protrusion 1522 and a second outward protrusion 1523. In this case, the first inward protrusion 1012 and the first outward protrusion 1522 may constitute a first OIS stopper, and the second inward protrusion 1013 and the second outward protrusion 1523 may constitute a second OIS stopper. Therefore, the first OIS stopper and the second OIS stopper may be perpendicular to the AF driving surface 1310 and disposed symmetrically on both sides with reference to the plane passing through the optical axis.

For each of the inward protrusions 1012 and 1013, the lengths a1 and a2 in the first direction in the protrusion accommodating grooves 1014 and 1015 may be formed to be longer than the maximum stroke length (s, referring to FIG. 5 and FIG. 6) in the first direction of the lens holder 152. Also, for each of the inner edge block 1016 and 1017, the lengths d1 and d2 in the first direction in the protrusion accommodating grooves 1014 and 1015 may be formed to be longer than the maximum stroke length s of the lens holder 152 in the first direction.

Therefore, even when the lens holder 152 is moved to the maximum in the first direction left (the -x direction of the drawing) or the first direction right (the +x direction of the drawing), the outward protrusions 1522 and 1523 may be supported without dislodging from the protrusion accommodating grooves 1014 and 1015.

The lengths b1 and b2 in the first direction of the outward protrusions 1522 and 1523 in the portion opposite to the inward protrusions 1012 and 1013 may be equal to or longer than the lengths a1 and a2 of the inward protrusions 1012 and 1013. Therefore, even when the lens holder 152 is moved in the first direction, the outward protrusions 1522 and 1523 may come into contact with the bottom surface in the protrusion accommodating grooves 1014 and 1015 and stop. This allows the OIS stopper to perform the function of a stopper that limits the movement of the lens holder 152 in the first direction as well as the movement in the second direction.

Figure 5:
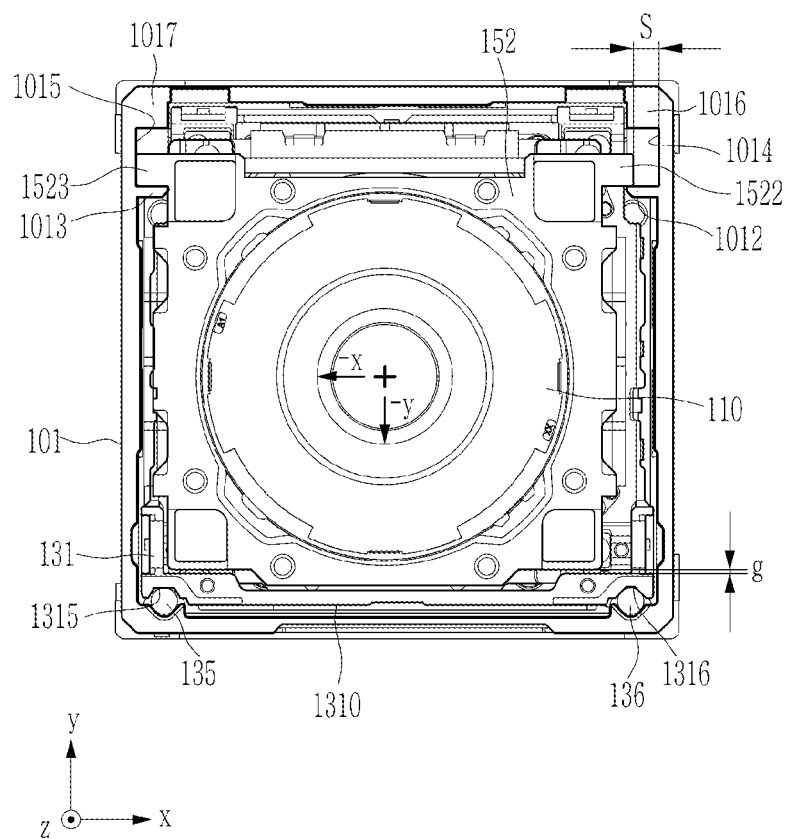
FIG. 5 is a plan view showing a lens driving apparatus of a camera module shown in FIG. 1 and shows a state in which a lens holder is driven by an OIS driving and is moved toward an AF driving surface.
Figure 6:
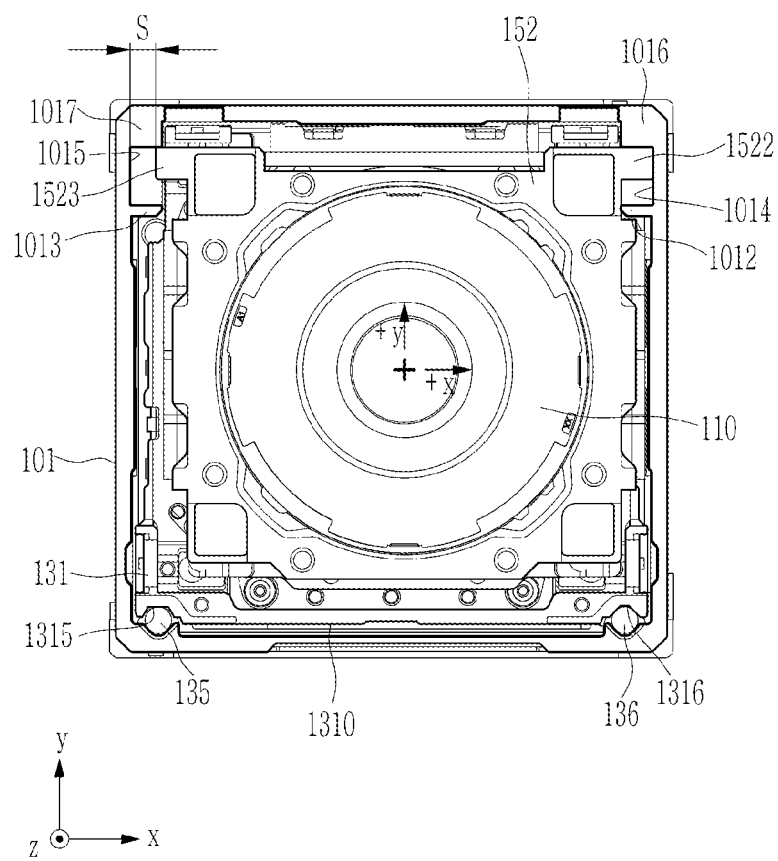
FIG. 6 is a plan view showing a lens driving apparatus of a camera module shown in FIG. 1 and shows a state in which a lens holder is driven by an OIS driving and is moved to the opposite side of an AF driving surface.

FIG. 5 and FIG. 6 are plan views showing a lens driving apparatus of a camera module shown in FIG. 1. FIG. 5 shows a state in which a lens holder is driven by OIS driving and is moved toward an AF driving surface, and FIG. 6 shows a state in which a lens holder is driven by OIS driving and is moved to the opposite side of an AF driving surface.

The lens holder 152 equipped with the lens barrel 110 may be moved in the first direction (the x-axis direction in the drawing) or the second direction (the y-axis direction in the drawing) within the AF carrier 131 by the OIS drivers 141, 142, and 143. At this time, while the first and second outward protrusions 1522 and 1523 protruded from the exterior side of the lens holder 152 are accommodated in the first and second protrusion accommodating grooves 1014 and 1015 formed on the inner surface of the side wall of the housing 101, respectively, and are driven, the movement range thereof may be limited by the inner side and bottom surfaces of the protrusion accommodating grooves 1014 and 1015. The inner side of the protrusion accommodating grooves 1014 and 1015 may function as a locking jaw for the outward protrusions 1522 and 1523 of the lens holder 152.

Referring to FIG. 5, the lens holder 152 moves to the left (the -x direction) in the drawing in the first direction and downward (the -y direction) in the drawing in the second direction. At this time, the inward protrusions 1012 and 1013 of the housing 101 are in contact with the outward protrusions 1522 and 1523 of the lens holder 152 while facing in the second direction, limiting the movement of the lens holder 152 in the second direction. The maximum distance from the opposite surfaces of the inward protrusions 1012 and 1013 of the outward protrusions 1522 and 1523 to the outer surface of the lens holder 152 opposite to the inner surface of the AF driving surface 1310 of the AF carrier 131 is formed to be shorter than the maximum distance from the opposite surfaces of the outward protrusions 1522 and 1523 of the inward protrusions 1012 and 1013 to the inner surface of the AF driving surface 1310 of the AF carrier 131 so that the lens holder 152 and the AF carrier 131 may not collide with each other on the inner side of the AF driving surface 1310.

In this case, the inner surface where the AF driving surface 1310 of the AF carrier 131 is disposed and the outer surface of the lens holder 152 facing thereto may be spaced apart from each other with a gap g. The inside wall collision of the AF carrier 131 that may occur as the lens holder 152 moves in the second direction within the AF carrier 131 may be prevented, and the gap g may be an anti-collision spacing. Also, the ball rolling portions 1315 and 1316 of the AF driving surface 1310 may be prevented from being stamped by the rolling members 135 and 136 disposed on the AF driving surface 1310.

The bottom surface of the second protrusion accommodating groove 1015 of the housing 101 is in contact with the second outward protrusion 1523 of the lens holder 152 in the first direction to limit the movement of the lens holder 152 in the first direction. In this case, the length b2 in the first direction of the second outward protrusion 1523 in the portion opposite to the second inward protrusion 1013 may be equal to or longer than the length a2 of the second inward protrusion 1013. Thus, the second outward protrusion 1523 of the lens holder 152 is more protruded outward than the exterior side of the lens holder 152, so that the exterior side of the lens holder 152 may not collide with the inner surface of the side wall of the housing 101.

Meanwhile, in the first inward protrusion 1012, the length a1 in the first direction in the first protrusion accommodating groove 1014 may be longer than a maximum stroke length s of the lens holder 152 in the first direction. Therefore, even when the lens holder 152 is moved to the left of the first direction (the −x direction of the drawing), the first outward protrusion 1522 may be supported without dislodging from the first protrusion accommodating groove 1014. Referring to FIG. 6, the lens holder 152 moves to the right (the +x direction) of the drawing in the first direction and moves upward (+y direction) of the drawing in the second direction. At this time, one side of the inner edge blocks 1016 and 1017 of the housing 101 is in contact with the outward protrusions 1522 and 1523 of the lens holder 152 while facing in the second direction to limit the movement of the lens holder 152 in the second direction. The outward protrusions 1522 and 1523 are formed at the end of the lens holder 152, which is spaced farthest from the AF driving surface 1310 in the second direction, so that the lens holder 152 may not collide with the inner surface of the side wall of the housing 101.

The bottom surface of the first protrusion accommodating groove 1014 of the housing 101 is in contact with the first outward protrusion 1522 of the lens holder 152 in the first direction to limit the movement of the lens holder 152 in the first direction. In this case, the length b1 in the first direction of the first outward protrusion 1522 in the portion opposite to the first inward protrusion 1012 may be equal to or longer than the length a1 of the first inward protrusion 1012. Therefore, the first outward protrusion 1522 of the lens holder 152 is more protruded outward than the exterior side of the lens holder 152 so that the exterior side of the lens holder 152 may not collide with the inner surface of the side wall of the housing 101.

In the second inner edge block 1017, a length d2 in the first direction in the second protrusion accommodating groove 1015 may be longer than a maximum stroke length s of the lens holder 152 in the first direction. Therefore, even when the lens holder 152 is moved to the right of the first direction (the +x-direction of the drawing) as far as possible, the second outward protrusion 1523 may be supported without dislodging from the second protrusion accommodating groove 1015.

As above-described, in the camera module 100, according to the present embodiment, the lens holder 152 is driven by the OIS drivers 141, 142, and 143 in the first direction or second direction, and provided with the outward protrusions 1522 and 1523 accommodated in the protrusion accommodating grooves 1014 and 1015 of the housing 101, so that the movement range may be limited by the inner side and bottom surfaces of the protrusion accommodating grooves 1014 and 1015 or the inward protrusions 1012 and 1013. This prevents or mitigates the impact between lens holder 152 and the AF carrier 131 or between the lens holder 152 and the housing 101 inside the housing 101 due to the OIS operation. In addition, it is possible to prevent deformation due to this impact, such as indentations or stamping caused by the rolling members in the internal structure of the camera module 100, for example, the AF rolling part.

That is, for the OIS stopper of the camera module 100, according to the present embodiment, the protrusion accommodating grooves 1014 and 1015 are provided in the housing 101 accommodating the AF carrier 131 so that the outward protrusions 1522 and 1523 of the lens holder 152 may be accommodated to limit the movement in the first direction or the second direction. Therefore, even if the lens holder 152 is moved along directions perpendicular to the optical axis, and vibration is induced, the effect of the vibration may be isolated from the AF carrier 131.

The camera module, according to an embodiment, may increase reliability by mitigating impact between the lens transferring unit and the counterpart driven inside the module, thereby preventing deformation.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a housing having an interior space;
   an Auto Focusing (AF) carrier disposed in the interior space of the housing and housing a lens barrel;
   a lens holder to which the lens barrel is fixed and accommodated in the AF carrier;
   an Optical Image Stabilization (OIS) driver configured to drive the lens holder to move in a first direction or a second direction perpendicular to an optical-axis, wherein the first direction and the second direction are perpendicular to each other within the AF carrier; and
   an OIS stopper including an inward protrusion protruding from one inner surface of the housing in the first direction towards the lens holder, and an outward protrusion protruding from one outer surface of the lens holder towards the one inner surface of the housing and opposite the inward protrusion in the second direction.

2. The camera module of claim 1, wherein
   the AF carrier includes an AF driving surface opposed to the one inner surface of the housing with a rolling member interposed therebetween, and
   each opposing surface of the outward protrusion and the inward protrusion face a direction perpendicular to the AF driving surface.

3. The camera module of claim 2, wherein
   when the outward protrusion and the inward protrusion face each other and are in contact,
   one inner surface of the AF carrier where the AF driving surface is disposed and the one outer surface of the lens holder facing each other are spaced apart.

4. The camera module of claim 2, wherein
   the outward protrusion is disposed at an end of the lens holder furthest away from the AF driving surface in the second direction.

5. The camera module of claim 1, wherein
   the housing includes a protrusion accommodating groove configured to accommodate the outward protrusion on the one inner surface where the inward protrusion is disposed, and the inward protrusion forms the inner surface of one side of the protrusion accommodating groove.

6. The camera module of claim 5, wherein
another inner surface of the protrusion accommodating groove is configured to face the outward protrusion in the second direction.

7. The camera module of claim 5, wherein
a length along the first direction of the inward protrusion facing the outward protrusion within the protrusion accommodating groove is longer than a length of a maximum stroke of the lens holder in the first direction.

8. The camera module of claim 1, wherein
the AF carrier includes an AF driving surface opposed to the one inner surface of the housing with a rolling member interposed therebetween, and
the OIS stopper further includes a first OIS stopper and a second OIS stopper disposed on both sides of a reference plane perpendicular to the AF driving surface and passing through the optical-axis.

9. The camera module of claim 8, wherein
the first OIS stopper further includes a first inward protrusion protruding from the housing and a first outward protrusion protruding from the lens holder,
the second OIS stopper includes a second inward protrusion protruding from the housing and a second outward protrusion protruding from the lens holder, and
the first outward protrusion and the second outward protrusion are symmetric about a plane perpendicular to the AF driving surface and passing through the optical axis.

10. A camera module comprising:
a housing having an interior space;
an Auto Focusing (AF) carrier disposed in the interior space of the housing and housing a lens barrel;
a lens holder to which the lens barrel is fixed and accommodated within the carrier;
an Optical Image Stabilization (OIS) driver configured to drive the lens holder to move in a first direction or a second direction perpendicular to the optical-axis within the carrier, wherein the first direction and the second direction are perpendicular to each other; and
an OIS stopper including an outward protrusion protruding in the first direction from a one outer surface of the lens holder toward a one inner surface of the housing, and a protrusion accommodating groove recessed from the one inner surface of the housing to accommodate the outward protrusion and having an inner side surface to limit a movement range of the outward protrusion in the second direction.

11. The camera module of claim 10, wherein
the AF carrier includes an AF driving surface opposed to the one inner surface of the housing with a rolling member interposed therebetween, and
the inner side surface of the protrusion accommodating groove and each opposing surface of the outward protrusion face a perpendicular direction to the AF driving surface.

12. The camera module of claim 11, wherein
when the inner side surface of the protrusion accommodating groove and the outward protrusion face each other and are in contact,
the one inner surface where the AF driving surface of the AF carrier is disposed and the one outer surface of the lens holder facing each other are spaced apart.

13. The camera module of claim 12, wherein
one inner surface of the protrusion accommodating groove farthest from the AF driving surface is configured to face the outward protrusion in the second direction.

14. The camera module of claim 10, wherein
the AF carrier includes an AF driving surface opposed to the one inner surface of the housing with a rolling member interposed therebetween, and
the OIS stopper includes a first OIS stopper and a second OIS stopper that are disposed on both sides of a reference plane perpendicular to the AF driving surface and passing through the optical axis.

15. The camera module of claim 14, wherein
the first OIS stopper further includes a first protrusion accommodating groove recessed on the one inner surface of the housing and a first outward protrusion protruding from the lens holder,
the second OIS stopper includes a second protrusion accommodating groove recessed on the other surface of the inner side of the housing and a second outward protrusion protruding from the lens holder, and
the first outward protrusion and the second outward protrusion are symmetric about a plane perpendicular to the AF driving surface and passing through the optical axis.

16. The camera module of claim 10, wherein
the protrusion accommodating groove has a bottom surface to limit a movement range of the outward protrusion in the first direction.

17. The camera module of claim 10, wherein
a length along the first direction of the inner side surface of the protrusion accommodating groove opposite the outward protrusion in the second direction is longer than a length of a maximum stroke of the lens holder in the first direction.

\* \* \* \* \*